United States Patent Office 2,838,559
Patented June 10, 1958

2,838,559

PROCESS FOR THE PRODUCTION OF ACRYLONITRILE

Wilhelm Müller, Leverkusen, Germany, assignor to Farbenfabriken Bayer Aktiengesellschaft, Leverkusen, Germany, a corporation of Germany No Drawing. Application July 24, 1956
Serial No. 599,684

Claims priority, application Germany August 2, 1955

2 Claims. (Cl. 260—465.3)

This invention relates to a process for the production of acrylonitrile.

In the production of acrylonitrile from acetylene and hydrocyanic acid in the presence of acid cuprous chloride solutions and at elevated temperature, the acetylene is usually pumped in circulation at such a velocity through the catalyst solution that some of the acetylene reacts with a corresponding amount of added hydrocyanic acid to form acrylonitrile.

It is known that an excess of hydrocyanic acid must be introduced in order to prevent secondary reactions such as the formation of monovinyl acetylene, divinyl acetylene, vinyl chloride and chloroprene in relatively large quantities and in order to achieve the maximum conversion of acetylene into acrylonitrile, such excess advantageously being in the region of 0.05–1.30 mols of hydrocyanic acid per mol of acetylene introduced, depending on the nature and activity of the catalyst.

The recovery of this excess of hydrocyanic acid from the circulating gas was formerly very complicated and in every case incomplete. In the prior known processes, the reaction gases leaving the catalyst are washed in countercurrent with water. Thereafter this water contains dissolved in addition to acrylonitrile, hydrocyanic acid, acetaldehyde, carbon dioxide, monovinyl acetylene, divinyl acetylene, chloroprene, cyanbutadiene, vinyl chloride and any other soluble constituents. The lactic acid nitrile which is formed from hydrocyanic acid and the acetaldehyde obtained as a by-product of the acrylonitrile formation and which causes a further loss of hydrocyanic acid can be removed from the acrylonitrile only with difficulty.

However, even the excess hydrocyanic acid which has not been converted into lactic acid nitrile cannot be reintroduced without complicated purification on account of its impurities of, for example, carbon dioxide, monovinyl acetylene and vinyl chloride, while the dangers involved in the handling thereof and the high degree of solubility in acrylonitrile provide added difficulties.

On account of these difficulties, the recovery of the excess hydrocyanic acid has hitherto frequently been disregarded. This means that it is necessary to work with the smallest possible excess of hydrocyanic acid, the consequence of which is that it is necessary to use a catalyst which is as inert as possible and which only requires a low ratio between the hydrocyanic acid introduced and the acetylene which is consumed (about 1.05) in order to suppress the secondary reactions. This in turn means that the installation has only a low capacity.

It has now been found that the hydrocyanic acid can be removed from the reaction mixture leaving the contact tower by means of an aqueous dispersion of metal oxides or metal hydroxides which give no alkaline reaction in aqueous suspension and which can form cyanides which are sparingly soluble in water if said cyanides are easily cleavable by the action of acids. The oxides and hydroxides of zinc and cadmium are especially suitable for the process of the invention, the zinc oxide being preferred.

Since these compounds can be dispersed very satisfactorily in water, the hydrocyanic acid is practically 100% absorbed from the reaction mixture. In order to prevent condensation of the acrylonitrile in the metal oxide suspension, the operation is advantageously carried out at a temperature in the region of 90–100% C. If this is done the hydrocyanic acid does not escape until the saturation of the zinc oxide with hydrocyanic acid is 70–80% of the theoretical.

If the hydrocyanic acid is recovered as described above, the formation of lactic acid nitrile from the acetaldehyde, formed as a by-product, and hydrocyanic acid is nearly completely suppressed. Thus, my invention provides not only an economical process for the recovery of excess hydrocyanic acid but facilitates as well the purification of the acrylonitrile.

The hydrocyanic acid can be recovered from the metal cyanide practically quantitatively and simply. It can, for example, be recovered by adding sulfuric acid, hydrochloric acid or another mineral acid gradually to the metal cyanide suspension at elevated temperature, for example 90° C., and distilling off the hydrocyanic acid which is formed. An amount of caustic soda solution or another neutralization agent such as soda corresponding to the amount of sulfuric acid used is thereafter run in, also at 90–100° C., the metal being precipitated again as a good sediment of the oxide or hydroxide. The sodium sulfate solution which is formed can be removed by decanting; the metal oxide is again ready for use.

It is advantageous for two absorption vessels containing the aqueous suspension of the metal oxide to be connected in series, so that the metal oxide in the first absorption vessel can be used until it can absorb no more hydrocyanic acid.

The following examples further illustrate the invention without, in any way, limiting it thereto.

*Example 1a*

283 grams of acetylene and 354 grams of hydrocyanic acid are continuously reacted to form acrylonitrile over a period of 12 hours in an acid cuprous chloride catalyst, which is heated to 80° C. The ratio between the hydrocyanic acid introduced and the acetylene which is consumed is 1:25.

The reaction mixture leaving the catalyst is passed through a washing column where it is washed with water, and the gases not absorbed by the water are pumped back to the catalyst.

The following compounds are thereafter present in the washing water:

480 grams of acrylonitrile,
78 grams of hydrocyanic acid,
70 grams of lactic acid nitrile.

*Example 1b*

261 grams of acetylene are continuously reacted with 308 grams of hydrocyanic acid over a period of 9 hours to form acrylonitrile, this taking place in a cuprous chloride catalyst, which is heated to 80° C. The ratio between the hydrocyanic acid and acetylene used is 1:18.

Before the reaction mixture leaving the catalyst passes through the washing column, it is fed through a suspension of 300 grams of zinc oxide in 1 liter of water, the suspension being heated to 90° C.

The following compounds are thereafter present in the washing water:

431 grams of arcylonitrile,
37.2 grams of acetaldehyde, partly as lactic acid nitrile,
3.0 grams of hydrocyanic acid, partly as lactic acid nitrile.

75 grams of hydrocyanic acid can be recovered from the metal/oxide cyanide suspension by neutralizing with sulfuric acid.

*Example 2*

250 grams of acetylene are reacted over a period of 10 hours with 300 grams of hydrocyanic acid to form acrylonitrile, this taking place in an acid cuprous chloride catalyst which is heated to 80° C. The ratio between the hydrocyanic acid and acetylene introduced is 1:20.

Before the reaction mixture passes through the washing column, it is fed at a temperature of 90° C. through a suspension of 500 grams of cadmium oxide in 1 liter of water, which suspension had been formed by reacting cadmium sulfate with caustic soda solution.

The following compounds are thereafter present in the washing water:

420.0 grams of acrylonitrile,
42.3 grams of acetaldehyde, which is in part present as lactic acid nitrile,
6.0 grams of hydrocyanic acid, which is in part present as lactic acid nitrile.

71 grams of hydrocyanic acid were recovered from the cadmium oxide/cadmium cyanide suspension.

I claim:

1. A process for the continuous production of acrylonitrile from the acetylene and hydrocyanic acid in the presence of an acid cuprous chloride catalyst, which comprises subjecting the gases obtained in the reaction immediately after leaving the reaction chamber to a treatment with an aqueous suspension of a member selected from the group consisting of zinc and cadmium oxide and hydroxide and recovering the hydrocyanic acid in known manner from a member of the group of zinc cyanide and cadmium cyanide formed.

2. A process as claimed in claim 1, wherein the treatment with the aqueous zinc or cadmium oxide suspension is carried out at elevated temperature.

References Cited in the file of this patent

UNITED STATES PATENTS

| | | |
|---|---|---|
| 2,351,157 | Semon | June 13, 1944 |
| 2,653,966 | Taylor et al. | Sept. 29, 1953 |
| 2,664,396 | Riley et al. | Dec. 29, 1953 |